United States Patent [19]
Miwa et al.

[11] Patent Number: 6,032,521
[45] Date of Patent: Mar. 7, 2000

[54] POSITION SENSOR

[75] Inventors: Akihide Miwa; Yoshiyuki Takahashi, both of Kanagawa, Japan

[73] Assignee: The Whitaker Corporation, Wilmington, Del.

[21] Appl. No.: 09/142,243

[22] PCT Filed: Dec. 16, 1996

[86] PCT No.: PCT/US96/20456

§ 371 Date: Jun. 16, 1998

§ 102(e) Date: Jun. 16, 1998

[87] PCT Pub. No.: WO97/22847

PCT Pub. Date: Jun. 26, 1997

[30] Foreign Application Priority Data

Dec. 20, 1995 [JP] Japan ................................. 7-349301

[51] Int. Cl.[7] .................................................. G01D 5/165
[52] U.S. Cl. .......................................... 73/118.1; 338/164
[58] Field of Search ........................... 73/118.1; 338/164, 338/258

[56] References Cited

U.S. PATENT DOCUMENTS

| | | | |
|---|---|---|---|
| 4,688,420 | 8/1987 | Minagawa | 73/118.1 |
| 4,703,649 | 11/1987 | Eitoku et al. | 73/118.1 |
| 4,719,795 | 1/1988 | Eitoku et al. | 73/118.1 |
| 5,567,874 | 10/1996 | Suzuki et al. | 73/118.2 |

FOREIGN PATENT DOCUMENTS

| | | |
|---|---|---|
| 0 670 473 A1 | 9/1995 | European Pat. Off. . |
| 4-92601 | 8/1992 | Japan . |
| WO 97/22847 | 6/1997 | WIPO . |

*Primary Examiner*—John E. Chapman

[57] ABSTRACT

A position sensor comprises a housing (10), a rotor (16) having brushes (36, 36) thereon rotatably mounted in the housing, a base plate (20) mounted to the housing, conductive members (48, 50, 52) on the base plate in electrical connection with the brushes, the base plate (20) forming a cover member for the housing so that an outer surface (47) thereof is exposed to the outside. Such an arrangement results in a position sensor with a reduced number of components having improved heat dissipation characteristics and better reliable electrical connections.

8 Claims, 2 Drawing Sheets

POSITION SENSOR

This invention relates to position sensors used for the detection of the angle of rotation of rotating objects and more particularly to a position sensor have a smaller number of components.

Potentiometer-type position sensors are widely used for measurements of angle of rotation of throttle valves in automotive engines. FIG. 5 is a cross-sectional view of a conventional position sensor 100 disclosed in Japanese Utility model Publication No. 92-92601. The position sensor 100 comprises a main housing 102 supporting a rotor 104 which can rotate therein. Sliding brushes 106 are fixed to ore end of the rotor, and a base plate 110 is secured to main housing 102 on whose surface resistor elements 108 are located which are in electrical contact with sliding brushes 106. A cover housing 116 encloses the base plate 110 and other internal components and electrical terminals 114 are located on the outside of the main housing 102 which are connected to the base plate 110 by means of electrical conductors 112. In addition, the position sensor has a lever 118 connecting the rotor 104 to the throttle valve (not shown) and a torsion coil spring 120 whose purpose is to return the rotor to an initial position. The point between the main housing 102 and the cover housing 116 is sealed by adhesive 124.

A large number of components in the conventional position sensor 100 results in difficulty in reduction of its cost because of complicated parts inventory management, large number of assembly operations, high cost of materials, etc. In addition, since a layer of air 122 is present between the outer side of the base plate 110 and the cover housing 116 which prevents that generated by the base plate 110 from dissipating, there is a danger that due to thermal expansion of the base plate 110, the position sensor 100 will provide erroneous operation. In order to improve heat dissipation, it is possible to make the base plate 110 from a ceramic material, but it will result in a higher price of the position sensor and in a more complicated manufacturing process.

Conductors 112 connecting base plate 110 and terminals 114 are joined in several locations by rivets, soldering or other means. This results in a reduced reliability of electrical connections.

Therefore, the first purpose of this invention is to provide a position sensor which would have a smaller number of components, which would require fewer assembly operations, which would have a lower price and which provides reliable operation.

The second purpose of this invention is to offer a position sensor having an improved reliability of electrical connections by substantially reducing the number of electrical connections.

A position sensor according to the present invention comprises a housing, a rotor having brushes fixed to it and an integral sleeve for a shaft attachment which is support in the housing in such a manner that it can rotate, and a cover member in the form of a base plate having on its surface a resistor element making contact with the brushes wherein the outside surface of the base plate is directly exposed to the outside.

A position sensor according to the present invention includes a terminal unit connector to the resistor element through an electrical connection means intended for the connection to mating contacts wherein the terminal unit is an integral part of base plate.

A position sensor according to the present invention wherein the electrical connection means and the terminal unit are made as conductive patterns formed on a bottom surface of the base plate.

A position sensor comprises a housing, a rotor having brushes thereon rotatably mounted in the housing, a base plate mounted to the housing, and conductive members on the base plate in electrical connection with the brushes, wherein the base plate is a cover member for the housing so that an outer surface thereof is exposed to the outside and the conductive members extend along a bottom surface of the base plate.

An embodiment of the present invention will now be described by way of example with reference to the accompanying drawings in which.

Figure 1:
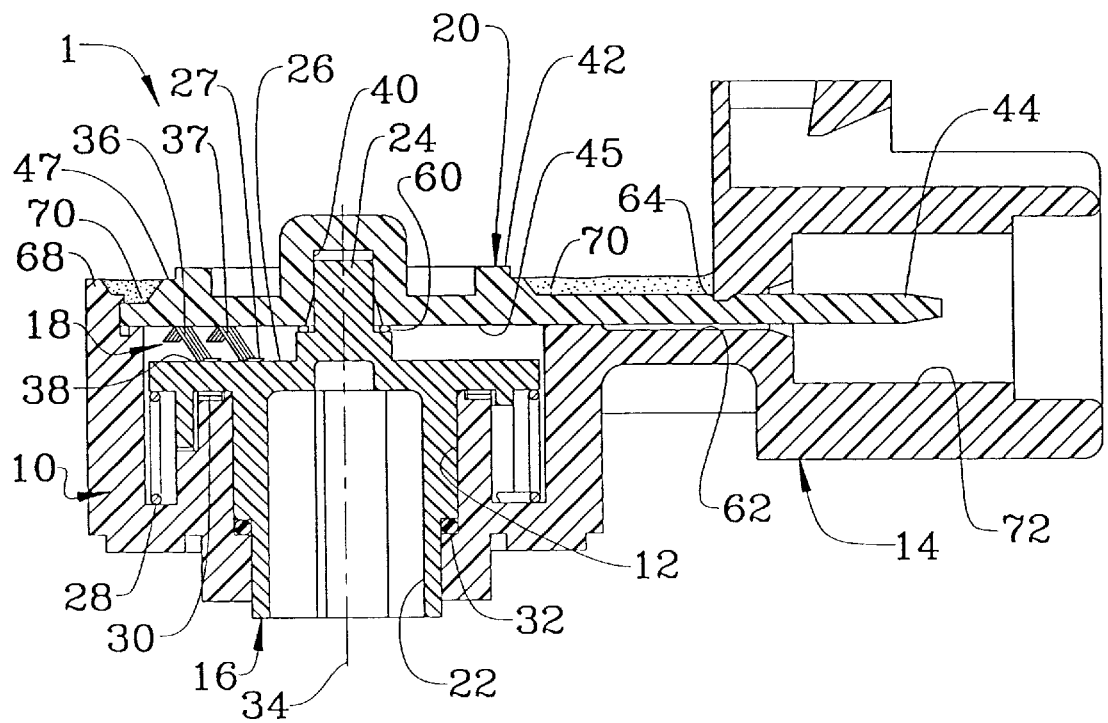
FIG. 1 is a cross-sectional view of a position sensor of the present invention.
Figure 5:
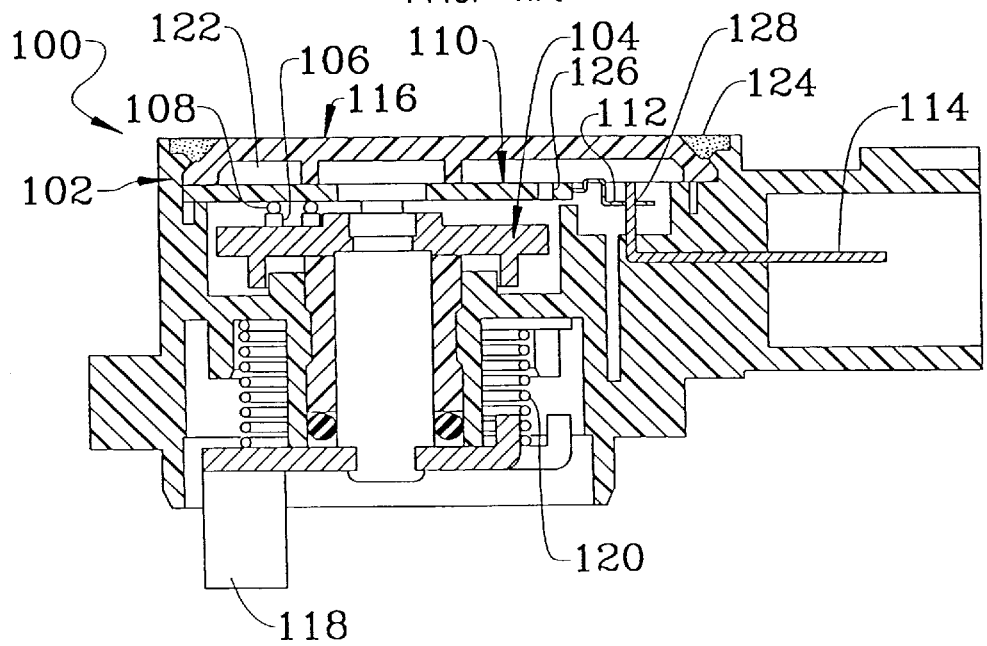
FIG. 5 is a cross-sectional view of a conventional position sensor.

Position sensor 1 comprises a housing 10 having a rotor cavity 12 and a connector unit 14 made as integral parts of the housing, a rotor 16 fitting inside the rotor cavity 12, a wiper brush unit 18, and a base plate 20 forming electrical contact with wiper brush unit 18. The rotor 16 has a shaft sleeve 22 into which a shaft of a throttle valve (not shown) of an automotive engine is inserted and a journal 24 located at the opposite end of the shaft sleeve 22 which fits in a cavity 40 of the base plate 20. In the vicinity of the journal 24, a flat surface 26 is formed to which wiper brush unit 18 is fixed by thermal fusion or some other method known in the art.

A torsion coil spring 28, a spring washer 30 and a seal, for example O-ring 32, are installed between the housing 10 and the rotor 16. The seal can be also made as an X-ring, a U-packing, V-packing, etc. The purpose of the torsion spring 28 is to return the rotor 16 to its original position by rotating the rotor around its axis 34. The spring washer 30 prevents play between the housing 10 and the rotor 16 in vertical direction as seen in FIG. 1. The purpose of the O-ring 32 is to maintain air tightness in the space between the housing 10 and the rotor 16 in order to prevent penetration of water, oil or other foreign substances from underneath (as seen in FIG. 1).

The wiper brush unit 18 includes brushes 36, 37 made from springy metal which sweep around the base plate 20, thus forming connection and mounting elements 38 which are secured to lugs 27 formed on the flat surface 26 of the rotor 16 by means of a thermal fusion method.

Figure 2:
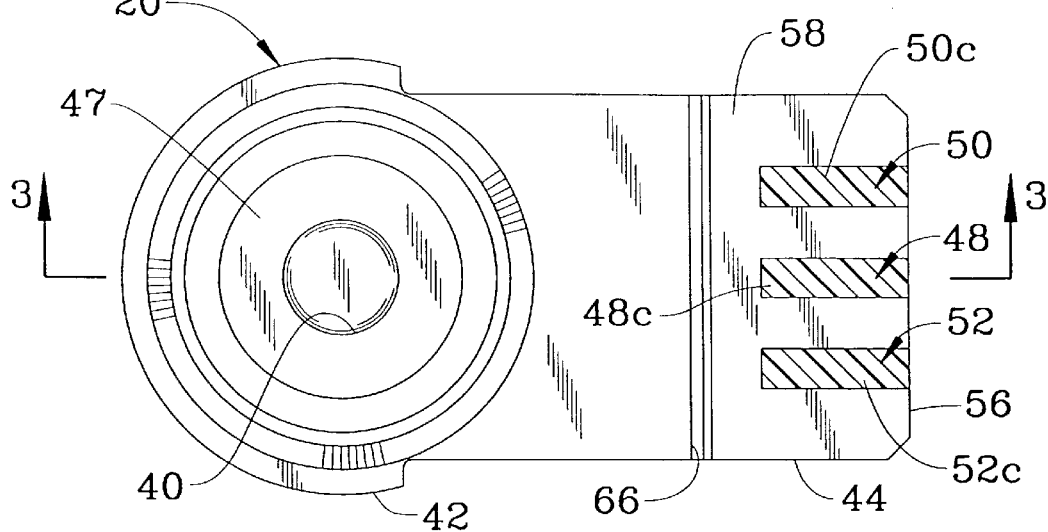
FIG. 2 is a top plan view of a base plate used in the position sensor of FIG. 1.
Figure 3:
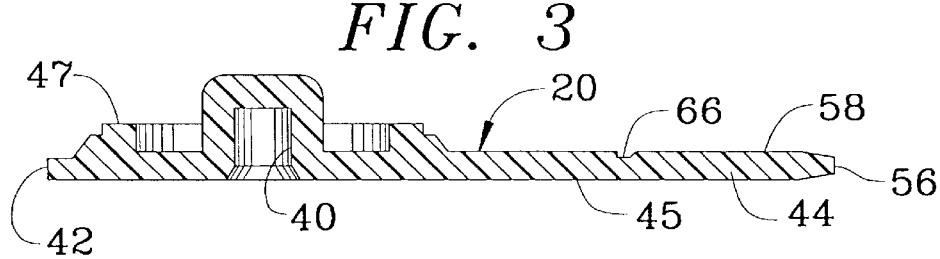
FIG. 3 is a cross-sectional view taken along line 3—3 of FIG. 2.
Figure 4:
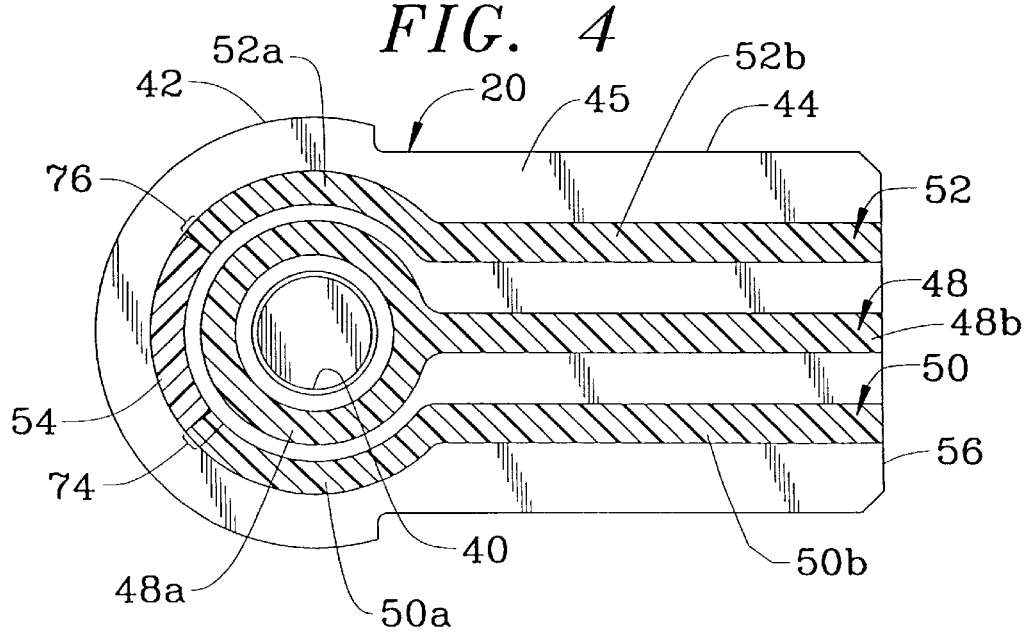
FIG. 4 is a bottom plan view of the base plate.

As can be seen from FIGS. 1 and 2, the base plate 20 is made as an integral unit having at its center a cavity 40 for the journal 24 of the rotor 16, an element unit 42 and a terminal unit 44. The base plate 20 is made preferably of a liquid crystal polymer material possessing heat resistance sufficient to withstand baking temperatures (which will be explained below) and good plasticity, such as for example PPS.

Since the position sensor according to this invention, unlike conventional position sensors, does not have a cover housing, the outer surface 47 of the base plate 20 is exposed to the outside and heat generated in the base plate 20 is dissipated directly from the outer surface 47, thus greatly improving heat dissipation characteristics thereof. This makes it possible to minimize dimensional distortion of the base plate 20 due to thermal expansion without using expensive ceramic materials having poor molding properties.

On the bottom surface 45 of the base plate 20, a first conductive pattern 48 is made which includes a circular section 48a concentric with the cavity 40 and a connecting extension 48b leading to the front edge of the terminal unit 44. Second and third conductive patterns 50, 52 are formed outside of the first conductive pattern 48 in the form of arcuate sections 50a, 52a and connecting extensions 50b, 52b to the front edge of the terminal unit 44 extending parallel to the first conductive pattern 48. A resistor element 54 shaped as a circular arc is made concentrically with the circular section of the first conductive pattern 48. It is connected to the ends of the second and third conductive patterns 50, 52 and has overlapping portions 74, 76 (overlap covers about 10°). The first brush 36 of the wiper brush unit makes contact with the resistor element 54, and the second brush 37 makes contact with the circular section 48a of the first conductive pattern 48. Since the path length of the resistor element 54 will depend on the angle of rotation of the rotor 16, the angle of rotation of the rotor 16 can be determined from the value of resistance between first conductive pattern 48 and second conductive pattern 50 or third conductive pattern 52. First, second and third conductive patterns 48, 50, 52 have connecting extensions 48c, 50c, 52c on the upper surface 58 of the terminal unit 44 which extend over the front edge surface 56. The fact that conductive patterns 48, 50, 52 are formed on both surfaces of terminal unit 44 results in an increased number of contact points of terminals with a receptacle connector (not shown), thus increasing reliability of electrical connection. Since the terminal unit 44 has conductive patterns formed on the same base plate 20, it eliminates the possibility of misalignment of contacts which often happens with metal contacts.

Below, explanations concerning the manufacturing process of the base plate 20 are provided. First, the base plate 20 is molded from a liquid crystal polymer or other resin which can be metal plated. Then, using molded interconnection device (MID) technology, three-dimensional conductive patterns 48, 50, 52 are formed from copper on the bottom surface 45, front edge surface 56 and upper surface 58 of the base plate 20. MID technology provides for one-sheet molding method and two-sheet molding method. Both methods can be applied to this invention. In the first embodiment described below, the one-sheet molding method was used.

First, the surface of the base plate 20 is etched with an aqueous solution of potassium hydroxide, and after roughing and catalytic treatment, the entire surface is metal plated by an electroless method. After that, the entire surface is evenly coated with a photoresist using electrodeposition, spraying, dipping or some other method. Subsequent exposure is performed in two or three steps using either several light sources simultaneously or reflectors. The next step is removal of photoresist from all areas but those of conductive patterns 48, 50, 52, after which the copper layer deposited by an electroless method is removed by an acid. By removing photoresist covering conductive patterns 48, 50, 52, three-dimensional conductive patterns 48, 50, 52 can be obtained.

The layer of copper thus obtained is plated with nickel; and, if necessary, it can be gold plated. Nickel 20 plating prevents conductive patterns 48, 50, 52 from oxidation at high temperatures. Gold plating improves reliability of connection between contacts of a mating receptacle connector (not shown) and the resistor element 54. After that, a paste whose main component is carbon powder is printed on the bottom surface of the base plate 20. After baking at 250° C., this paste is converted into resistor element 54, thus completing the process of manufacturing the base plate 20.

Next, the process of assembly of the position sensor 1 will be explained. At the beginning, the torsion coil spring 26 and the spring washer 30 are placed in the rotor cavity 12 of the housing 10. Then the rotor 16 with the wiper brush unit 18 and O-ring 32 mounted thereon is inserted in the cavity 40. A flat washer 60 is placed over the journal 24 of the rotor 16. After that, the terminal unit 44 of the base plate 20 is passed through the opening 62 provided in the connector unit 14 and, at the same time, the journal 24 of the rotor 16 is inserted in the cavity 40 of the base plate 20. At this time, a lug 64 protruding inside the opening 62 latches in the groove 66 made in the upper surface 58 of the terminal unit 44, thus preventing the forward (in FIG. 1 it is direction to the right) movement of the base plate 20. Next, the base plate 20 is temporarily secured on the housing 10 by softening via heating the outside edge 68 of the housing 10 along the circular portion of the element unit 42. The assembly process is completed by sealing the base plate 20 with an adhesive 70 between the outer edge of the element unit 42 and the housing 10. The sealing between the terminal unit 44 and the housing 10 is accomplished by sealing means provided at the mating receptacle connector (not shown) which engages against the inner walls of the connector unit 14.

Since the base plate 20 is made as an integral unit similar to base plates and terminal units in conventional position sensors, there is practically no place for intermediate connections in the unit, which makes it possible not only to reduce the number of parts and assembly operations, but also to substantially increase reliability of electrical connections.

Above, explanations concerning the preferable embodiment of this invention have been provided; however, this invention is not limited only to the embodiment described above, and it is a matter of course that this invention covers also modifications and variations which can be introduced as required.

The effect of the position sensor according to this invention consists in the fact that the base plate is the cover member so that the outer surface of the base plate is exposed to the outside which makes it possible not only to reduce the number of parts and assembly operations, but also to greatly increase the accuracy of operation due to an increased thermal resistance as well as improve heat dissipation.

The effect of the position sensor according to this invention consists in the fact that its design makes it possible not only to reduce the number of parts and assembly operations, but also to improve reliability of electrical connection between resistor elements and terminal contacts.

We claim:

1. A position sensor comprising
a housing having a rotor cavity;
a rotor having one section rotatably mounted in the rotor cavity;
a base plate acting as a cover member secured onto the housing and having an element unit and a terminal unit, the element unit overlying the rotor cavity and supporting another section of the rotor, the terminal unit extending outwardly beyond the rotor cavity;
conductive members provided on a bottom surface of the element unit and the terminal unit; and
a wiper brush unit extending between the rotor and the conductive members on the element unit forming an electrical connection therebetween.

2. A position sensor as claimed in claim 1, wherein the conductive members on the bottom surface of the element unit include an inner circular section and arcuate sections spaced outwardly from the circular section.

3. A position sensor as claimed in claim 2, wherein a resistor element is connected to the arcuate sections.

4. A position sensor as claimed in claim 3, wherein the circular section and the arcuate sections are concentric with respect to a cavity in the element unit in which the other section of the rotor is disposed.

5. A position sensor as claimed in claim 2, wherein the conductive members on the bottom surface of the terminal unit include a center connecting extension connected to the circular section and outer connecting extensions connected respectively to the arcuate sections, the center and outer connecting extensions extend to a front edge of the terminal unit.

6. A position sensor as claimed in claim 5, wherein the center and outer connecting extensions include further center and outer connecting extensions extending along the front edge of the terminal unit and along an upper surface thereof.

7. A position sensor as claimed in claim 6, wherein the terminal unit and the connector unit include latches for latching and positioning the base plate and housing together.

8. A position sensor as claimed in claim 1, wherein the housing includes a connector unit in which the terminal unit of the base plate is disposed.

* * * * *